(12) United States Patent
Lindholm

(10) Patent No.: US 6,189,486 B1
(45) Date of Patent: Feb. 20, 2001

(54) APPARATUS FOR AND A METHOD OF PERFORMING AN ANIMAL-RELATED ACTION REGARDING AT LEAST A PART OF THE BODY OF AN ANIMAL

(75) Inventor: Leif Lindholm, Rönninge (SE)

(73) Assignee: Alfa Laval Agri AB (SE)

( * ) Notice: Under 35 U.S.C. 154(b), the term of this patent shall be extended for 0 days.

(21) Appl. No.: 09/242,745

(22) PCT Filed: Jul. 15, 1997

(86) PCT No.: PCT/SE97/01285

§ 371 Date: Feb. 22, 1999

§ 102(e) Date: Feb. 22, 1999

(87) PCT Pub. No.: WO98/08376

PCT Pub. Date: Mar. 5, 1998

(30) Foreign Application Priority Data

Aug. 29, 1996 (SE) .................................................. 9603077

(51) Int. Cl.[7] ............................................................ A01J 3/00
(52) U.S. Cl. ..................................... 119/14.02; 119/14.18
(58) Field of Search ................................. 119/14.02, 601, 119/14.08, 608, 609, 611, 612, 652, 666, 667, 670, 673, 678, 14.18; 452/173

(56) References Cited

U.S. PATENT DOCUMENTS

| 3,183,890 | * | 5/1965 | Albers . | |
| 4,223,635 | | 9/1980 | Akerman . | |
| 4,936,255 | * | 6/1990 | Pera | 119/14.08 |
| 5,069,160 | | 12/1991 | Street et al. . | |
| 5,383,423 | * | 1/1995 | Van der Lely . | |
| 5,390,627 | * | 2/1995 | Berg et al. | 119/14.08 |
| 5,474,023 | * | 12/1995 | Khodabandehloo et al. | 119/14.1 |
| 5,479,876 | * | 1/1996 | Street et al. | 119/14.08 |
| 5,605,503 | * | 2/1997 | Martin | 452/173 |
| 5,915,331 | * | 6/1999 | Kimm | 119/14.08 |

FOREIGN PATENT DOCUMENTS

| 091892 | 10/1983 | (EP) . |
| 309036 | 9/1988 | (EP) . |
| 349291 | 1/1990 | (EP) . |
| 535755 | 10/1992 | (EP) . |
| 535756 | 10/1992 | (EP) . |
| 537860 | 4/1993 | (EP) . |
| 572068 | 12/1993 | (EP) . |
| 630558 | 12/1994 | (EP) . |
| 630565 | 12/1994 | (EP) . |
| 2159370 | 11/1972 | (FR) . |
| 9203639 | 3/1992 | (WO) . |

* cited by examiner

Primary Examiner—Peter M. Poon
Assistant Examiner—Yvonne R. Abbott
(74) Attorney, Agent, or Firm—Hovey, Williams Timmons & Collins

(57) ABSTRACT

An apparatus for and a method of performing an animal-related action regarding at least a part of the body of an animal is proposed. The apparatus includes a cleaning tool (15), adapted to be brought into contact with the part of the body, a support (16, 17) provided to support the cleaning tool (15), and a drive element (18, 24) provided to move the cleaning tool (15) along the contour of the part of the body. A sensor (34) is provided to sense the contact of the cleaning tool (15) and the animal. Furthermore, a processor (36) is provided to determine the position of the part in response to the sensor.

21 Claims, 2 Drawing Sheets

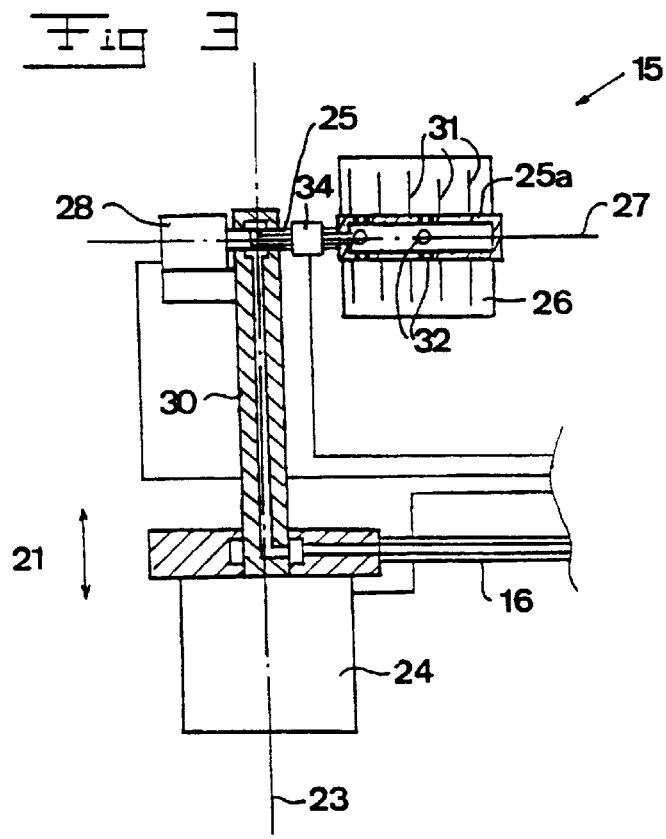
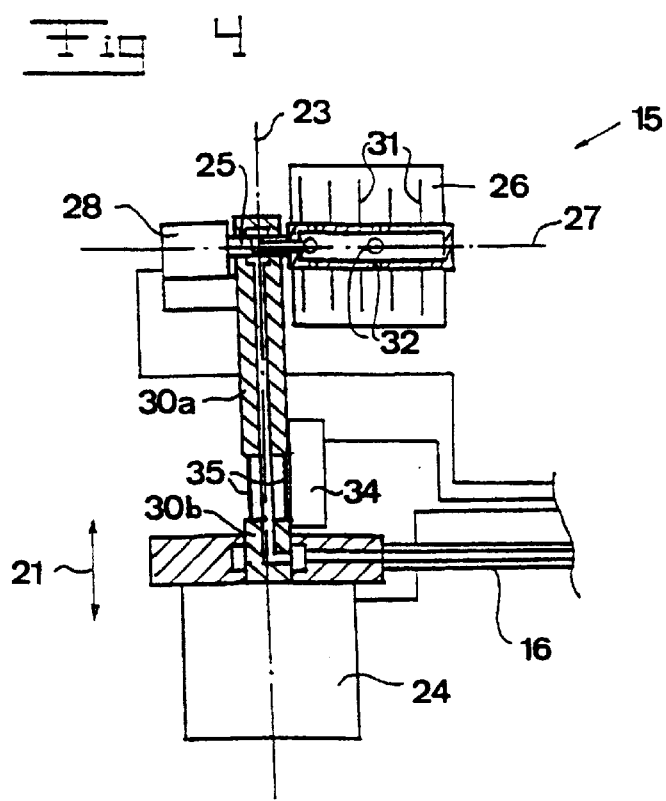

APPARATUS FOR AND A METHOD OF PERFORMING AN ANIMAL-RELATED ACTION REGARDING AT LEAST A PART OF THE BODY OF AN ANIMAL

BACKGROUND OF THE INVENTION

1. Field of the Invention

The present invention relates to an apparatus for performing an animal-related action regarding at least a part of the body of an animal, comprising a cleaning tool, adapted to be brought into contact with said part, a support means provided to support the cleaning tool, and a drive means provided to move the cleaning tool along the contour of said part. Furthermore, the present invention relates to a method of performing an animal-related action regarding at least a part of a body of an animal, comprising the steps of: bringing a cleaning tool into contact with said part, and moving the cleaning tool along the contour of the said part.

2. Description of the Prior Art

Automatic milking of animals is known from e.g. EP-A-91 892. Such automatic milking may take place in one or more combined feeding and milking stalls provided in a barn in which the animals are allowed to walk about freely and find their way voluntarily to the stalls for feeding, drinking and milking. The animals, voluntarily entering the milking stall, are automatically identified with the aid of a computer connected to identification means. By means of the computer, in which facts concerning each animal, when it was last milked, etc. are stored, an automatic handling device is activated to pick up the teatcups of a milking machine and attach them to the teats of the animal.

One problem in connection with such automatic milking is to determine the position of the teats of the animal being present in the stall in order to enable said attachment. A number of different solutions has been proposed to solve this problem. Thereby, one may differ between forcing systems and searching systems. Forcing systems are based on the idea of forcing, for example by physically pushing, the animal to a determined position in the milking stall and in which the teats then may be found by means of a sophisticated search equipment, for example including a video camera and image processing. Search systems are based on the idea that the animal may stay in any position in the milking stall and it is the task of the search system to determine the position of the animal. Thereby, a rough determination of the position of the animal may first be performed, and from this rough position, the position of the teats may be determined by means of a more sophisticated search equipment. Such search systems are advantageous in connection with voluntary milking described above, since it is important for the functioning of such a milking concept that the animals are encouraged to enter the milking stall and therefore forcing the animal should be avoided as far as possible. Furthermore, in connection with automatic milking it is known to determine the position of a cow being present in the milking stall by means of a device comprising spring biased arms abutting the cow and following her movements. Such a device functions for the determination of a rough position of the animal, from which position the teats of the animal then may be found by a more sophisticated search equipment. However, such devices are mechanically very complex with many moving elements, and therefore they are subjected to wear and the reliability thereof is not satisfying. Moreover, cows being fairly strong easily may damage such arms; a mere bending thereof results in an inaccurate measurement of the animal position.

Another problem in connection with automatic milking is that the udder and in particular the teats must be cleaned before the attachment of the teatcups. Such cleaning procedure must be possible to perform automatically. Thereby, it is known to spray a cleaning liquid, such as water, on the udder from beneath by means of a nozzle provided on the floor of the milking stall. However, such cleaning does not work satisfactorily for dirt being ingrained, thereby increasing the risk of contamination of the milk. Moreover, there is a number of prior art devices proposed for mechanically cleaning the teats before milking.

EP-A-535 755 discloses a device for cleaning the teats of milk-producing animals, having a computer with means for process control. With the aid of the computer a casing comprising two rotating brushes are moved against the udder to enclose the same, and thereby the brushes are contacting and cleaning the teats. Monitoring means are provided to determine the contamination of the teats and thus the termination of the cleaning process may be controlled.

EP-A-535 756 discloses a similar device having position determining means adapted to determine the position of the teats for facilitating the application of the cleaning device. The device disclosed in these two documents has a very complicated structure and large dimensions, making it difficult to house it in the already fairly limited space of the milking stall.

EP-A-643 910 discloses an implement for milking of animals. The implement comprises a milking robot having a robot arm being able to carry teatcups and a cleaning member for cleaning the teats of the animal. The cleaning member is provided to be coupled to or uncoupled from the robot arm.

FR-A-2 159 370 discloses an apparatus for cleaning the udder and the teats of a cow. The apparatus comprises a pair of rotating brushes which are movable against the udder of the cow by means of pneumatic cylinders.

EP-A-309 036 discloses a mechanism for cleaning the udder and the teats of a cow. The mechanism comprises a rotatable brush supported by a fork which is tiltable upwardly by means of a counterweight against the udder of the cow.

SUMMARY OF THE INVENTION

The object of the present invention is to provide an apparatus by which the problems discussed above may be solved. In particular, the object is to provide an apparatus for performing said animal-related action in a quick and reliable manner.

This object is obtained by the apparatus initially defined, which is characterized by a sensor provided to sense the contact of the cleaning tool and the animal, and by processing means provided to determine the position of said part in response to said sensor.

By combining such a cleaning tool with the sensor defined, the position of an animal part, such as the teats, may be automatically determined, and since said determination may be performed during a cleaning operation, the efficiency of said animal-related action may be improved; in other words such determined positions facilitate a following automatic animal-related action, such as automatic attachment of the teatcups. Furthermore, by such an apparatus said animal part may be effectively cleaned before any animal-related action, such as milking. By moving the cleaning tool along the contour of said part during the cleaning operation, the tool itself may be of an uncomplicated and compact construction.

According to an embodiment of the present invention, the processing means is adapted to determine said position by determining the coordinates of the cleaning tool.

According to another embodiment of the present invention, means is provided to control the drive means and thus the movement of the cleaning tool along said contour in response to said sensor. In such a manner, the movement of the cleaning tool may be easily controlled and self-adapted to the individual animal to be cleaned.

According to a further embodiment of the present invention, the sensor comprises a force sensing element.

According to a further embodiment of the present invention, the processing means is provided to determine the position of said part in such a way that when the force sensed by the force sensing element exceeds a predetermined measuring level the position of the cleaning tool is registered. A force sensed by such a force sensing element is an indication of an object hindering the movement of the tool.

According to a further embodiment of the present invention, means is provided to control the drive means in such a way that when the force sensed by the force sensing element is outside a predetermined control range the direction of the movement of the cleaning tool is changed. By such control the cleaning tool will follow the contour of the udder of the animal.

According to a further embodiment of the present invention, the predetermined measuring level lies within the predetermined control range. Thereby, the processing means may be adapted to determine the position of said part when the force sensed by the force sensing element has a value between the predetermined control level and the predetermined measuring level.

According to a further embodiment of the present invention, data memory means is provided for storing data about the contour of said part and means is provided to compare said data with said position at least on one occasion in order to enable the identification of said part.

According to a further embodiment of the present invention, the drive means is adapted to move the cleaning tool along a first, preferably essentially horizontal, direction in a first cleaning step and along a second, preferably essentially horizontal, direction in a second cleaning step, said second direction being essentially perpendicular to said first direction.

According to a further embodiment of the present invention, means is provided to control the drive means for the determination of said position to move the cleaning tool within a limited space, in which said part is expected to be found. Thereby, the area to be sought by the apparatus my be reduced.

According to a further embodiment of the present invention, the cleaning tool comprises a rotating brush. By such cleaning tool, mainly all kinds of dirt may be removed from the teats.

According to a further embodiment of the present invention, equipment is provided for the performance of said animal related action regarding said part being positioned at least essentially in said position. Such animal-related action may include teatcup attachment, medical treatment, insemination, massaging, etc. The position determining possibility of the apparatus according to the present invention is particularly advantageous in connection with automatic milking, whereby said part may be a teat and the equipment may comprise at least one teatcup and an automatic handling device may be provided to attach said teatcup to said teat.

The object stated above is also obtained by the method initially defined and characterized by sensing the contact of the cleaning tool and said part during said movement along the contour, and determining the position of said part in response to said sensed contact.

BRIEF DESCRIPTION OF THE DRAWINGS

The present invention will now be explained more closely by the description of different embodiments thereof and with reference to the drawings.

FIG. 3 shows a partly sectional view of a cleaning tool according to another embodiment of the present invention.

FIG. 4 shows a partly sectional view of a cleaning tool according to another embodiment of the present invention.

DETAILED DESCRIPTION OF DIFFERENT EMBODIMENTS

Figure 1:
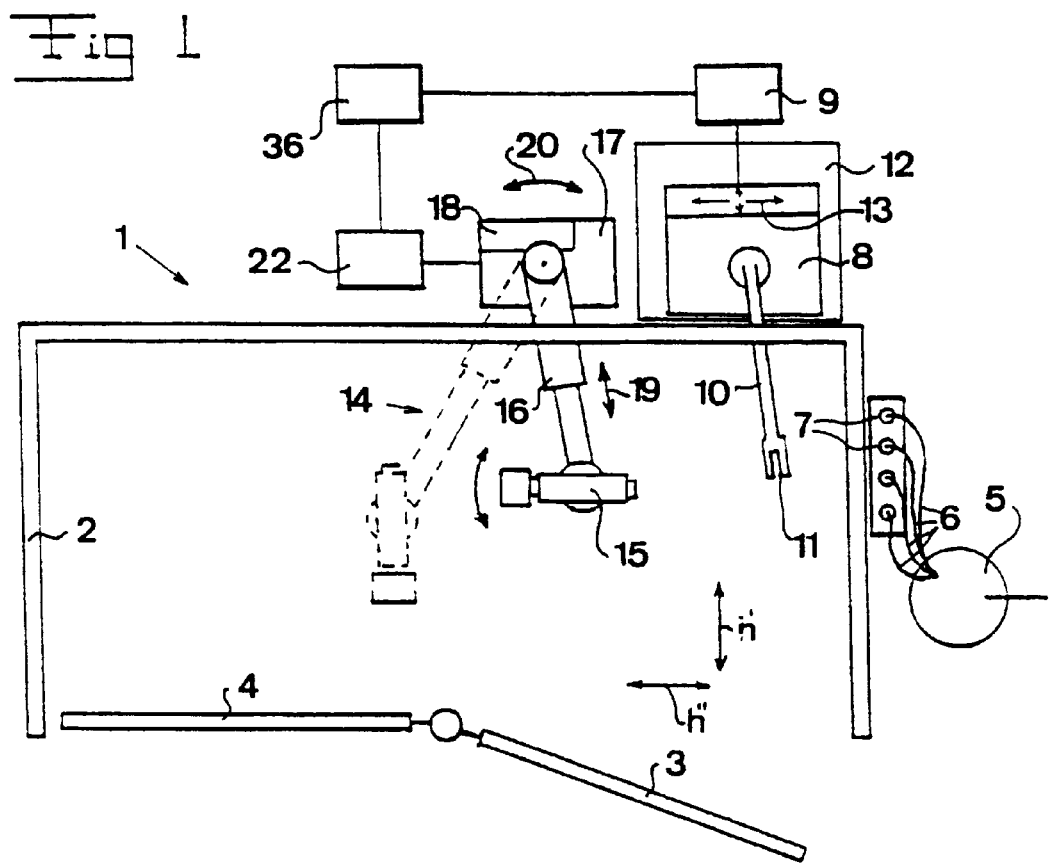
FIG. 1 shows a view from above of a milking stall having a cleaning apparatus according to the present invention.

With reference to FIG. 1, there is disclosed a milking stall 1 for housing a cow (not disclosed) to be milked, which milking stall 1 may be provided in a barn (not disclosed) housing many cows walking about freely. The milking stall 1 comprises enclosure means in the form of a surrounding grid device 2 defining a space in the milking stall 1. The grid device 2 comprises an inlet gate 3 and an exit gate 4. In connection to the milking stall 1, there is provided a milking machine, merely represented by a receptacle container 5, four milk conduits 6 and four schematically disclosed teatcups 7 to be attached to a respective teat of the cow being present in the milking stall 1. For said attachment, there is provided an automatic handling device 8 comprising an electronic control unit 9 and a robot arm 10 having gripping means 11. The robot arm 10 and the gripping means 11 may be controlled to grip successively a teatcup 7 and attach it to a teat of the cow. The automatic handling device 8 is provided on a support structure 12 and the automatic handling device 8 is movable relative to the support structure 12 in an essentially horizontal plane as indicated by the arrows 13.

Moreover, there is provided a cleaning apparatus 14, comprising a cleaning tool 15 to be brought into contact with the udder and the teats of the cow being present in the milking stall 1, and a support in the form of a movable arm 16. The arm 16 is movably attached to a base structure 17. The base structure 17 comprises a drive device schematically disclosed at 18 and provided to move the arm 16 and thus the cleaning tool 15 in different directions to be described. The arm 16 is telescopically extensible in its longitudinal direction indicated by the arrows 19. Moreover, the arm 16 is rotatable, as indicated by the arrows 20, about an essentially vertical axis. Finally, the arm 16 may rotate in a vertical plane to move the cleaning tool 15 up and down, which movement is indicated by the arrow 21 in FIG. 2. These movements are accomplished by the drive device 18 and controlled by a control means 22.

Figure 2:
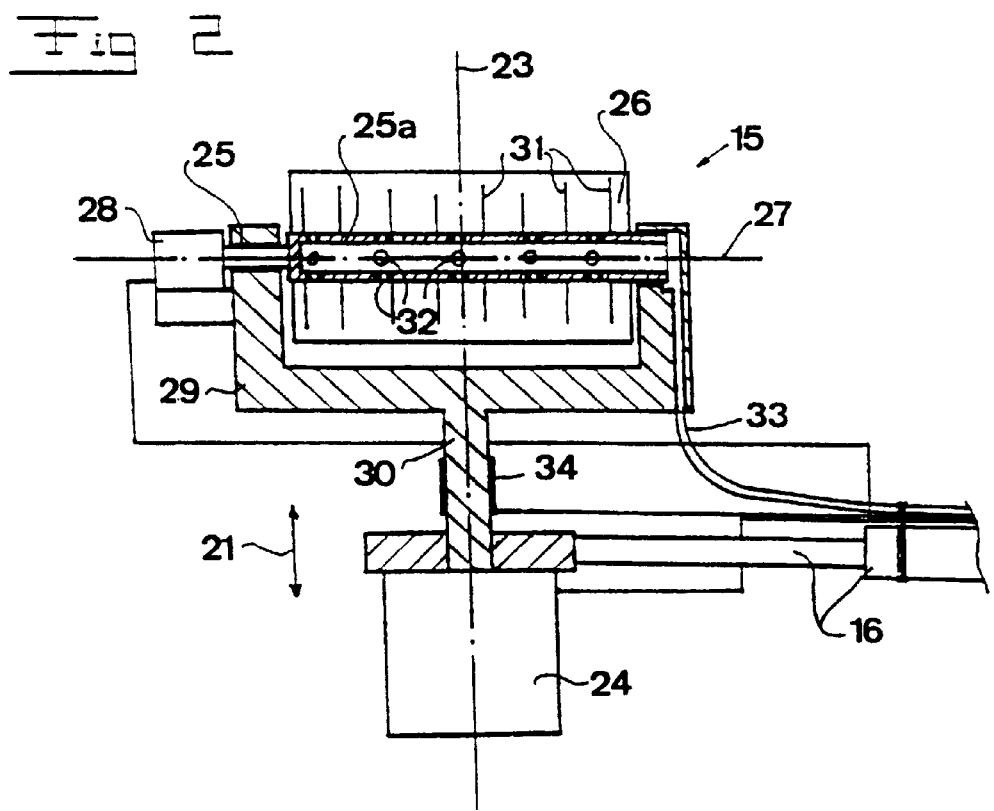
FIG. 2 shows a partly sectional view of a cleaning tool according to one embodiment of the present invention.

As may be seen from FIG. 2, the cleaning tool 15 is rotatably supported about an axis 23 on the movable arm 16. The rotation is accomplished by a drive means 24 provided on the arm 16. The operation of the drive means 24 is controlled by the control means 22. The cleaning tool 15 includes a tool shaft 25 and a rotating brush 26, which is rotatable around an axis 27 by means of a further drive means 28 provided on the cleaning tool 15 and connected to the control means 22 for the control of the operation of the rotating brush 26. The rotating brush 26 is supported by support means in the form of a fork-shaped holding device 29 having a shaft 30 rotatably supported in the arm 16 and connected to the drive means 24. The shaft 30 may be of an elastic material, for example rubber. The tool shaft 25 comprises a hollow shaft portion 25a provided with brush elements 31 extending in an essentially radial direction with reference to the axis 27 at least when the brush 26 is not rotated. The brush elements 31 are made of a flexible material, preferably a plastic material. The hollow shaft portion 25a is provided with openings 32 and connected to a supply of a cleaning liquid (not disclosed) via a liquid conduit 33.

FIG. 3 discloses another embodiment of the cleaning tool 15. It should be noted that elements having a corresponding function have been provided with the same reference signs in the embodiments disclosed. The embodiment disclosed in FIG. 3 differs from the one of FIG. 2 in that the support means is adapted to support the rotating brush 26 merely at one end, and thus the brush 26 is free at the other end. Thereby, the support means merely comprises an essentially vertical shaft 30 rotatably supported in the arm 16. The tool shaft 25 may be of an elastic material, for example rubber and the hollow shaft portion 25a is connected to the supply of a cleaning liquid via the conduit 33 extending internally through the shaft 30 and the arm 16, and is drivingly connected to the further drive means 28 provided on the shaft 30.

During a cleaning operation the drive device 18, disclosed in FIG. 2 and 3, is adapted to move the cleaning tool 15 along a first essentially horizontal direction h' in a first cleaning step, during which the axis 27 is essentially perpendicular to the direction h'. In a second cleaning step of the cleaning operation the drive device 18 is adapted to move the cleaning tool 15 in a second, essentially horizontal direction h", during which step the axis 27 is essentially perpendicular to the direction h". As may be seen from FIG. 1 the direction h' is essentially perpendicular to the direction h".

When the cleaning tool 15 is brought into contact with the udder of the cow a force is introduced in the drive line between the cleaning tool 15 and the drive device 18. This force results in a deformation of the components, such as the tool shaft 25, the shaft 30 and the arm 16, forming said drive line, and this force may be sensed by measuring and registrating said deformation by means of a force sensing element 34, which in the embodiment disclosed in FIG. 2 is provided on the shaft 30 of the cleaning tool 15 and in the embodiment disclosed in FIG. 3 is provided on the tool shaft 25. It should be noted that the force sensing element 34 may be provided at any location along the drive line between the cleaning tool 15 and the drive device 18. For instance, the force sensing element 34 may be in the form of a strain gauge, or an optical fibre provided between two curved plates, whereby the light transparency is inversely proportional to the curvature of the fibre and is thus changed when the plates are forced against each other. The force sensing element 34 may also sense the force directly and e.g. comprise a piezo-electrical sensor.

FIG. 4 discloses a further embodiment being similar to the embodiment of FIG. 3 but having a modified force sensing element 34. The shaft 30 is divided into an upper part 30a and a lower part 30b connected to each other by means of spring elements 35 so that the upper part may be bent or moved in relation to the lower part. The spring elements 35 may be of a suitable kind. For instance, a spring biased pivot joint may be provided between the upper and lower part 30a, 30b, or the spring effect may be obtained by the inherent elasticity of the shaft 30. The force sensing element is schematically indicated by the box 34 which may comprise micro switches or pneumatical valves. These switches or valves are activated when the upper part 30a of the shaft 30 is bent or moved in relation to the lower part 30b of the shaft 30 by the force resulting from the cleaning tool 15 being brought into contact with the udder and the teats of the animal.

Consequently, in all embodiments of the present invention, the forces acting on the cleaning tool 15 when it is brought into contact with and pressed against for example the cow to be cleaned may be sensed by means of the force sensing element 34. Thereby, the control means 22 is adapted to control the drive device 18 in such a way that when the force sensed by the force sensing element 34 is outside a predetermined control range the direction of the movement of the cleaning tool 15 is changed in a vertical plane. This means that if the cleaning tool 15 abuts the udder of the animal, the cleaning tool 15 will be moved downwards in a vertical direction 21 in such a way that the force sensed decreases. In the same way if the cleaning tool 15 comes out of contact with the udder of the cow, the cleaning tool 15 will be moved upwards into contact with the udder in such a way that the force sensed increases. In this way it is possible to control the cleaning tool 15 in such a way that it follows the contour of the udder. It should be noted that the movement in the horizontal direction h', h", i.e. the extending movement of the arm 16, may occur with a constant speed.

Furthermore, the control means 22 is provided to control the drive means 18, 24 for the determination of the position of the teat to move the cleaning tool 15 within a limited space, in which said teat is expected to be found.

The cleaning apparatus 14 also comprises processing means 36 adapted to determine the position of the teats of the cow in response to the forces sensed by the force sensing element 34. When the cleaning tool 15 is brought into contact with the udder a force will act on the cleaning tool 15, which force is sensed by the force sensing element 34. Since the udder is relatively fixed, the cleaning tool movement will continue until the upper limit of the control range has been reached. Thereafter, the cleaning tool 15 is moved in such a way that the force sensed decreases. When the cleaning tool 15 is brought against a teat a force sensed by the sensing element 34 is increased. However, since the teat is relatively resilient and less rigid than the udder the force due to the contact with the teat will be lower than the upper limit of the control range. Consequently, by the processing means 36 it is possible to determine and register the position of the cleaning tool 15 when the force sensed by the force sensing element 34 exceeds a predetermined measuring level which lies within the predetermined control range. From this cleaning tool position the position of the teat then may be calculated.

In order to enable identification of the teat, the processing means 36 may be adapted to store data in a memory about the contour of said teat and adapted to compare said data with the position determined at least on one occasion. Such data stored may be of a general nature and by measuring the udder and the teats of a great number of cows, e.g. all cows in the herd, it is possible to arrive at an average value concerning the udder and teat positions. In this case it is possible to determine the position of the teats of any cow entering the milking stall 1. No identification of the individual animal is necessary. Alternatively, such data stored may be specific for an individual animal. In the latter case identification means for identifying the individual animal to be cleaned should be provided.

As may be seen from FIG. 1, the processing means 36 is connected to the control unit 9 of the automatic handling device 8. The teat positions determined by the processing means 36 as described above may be transferred to the control unit 9 and utilized for automatic attachment of the teatcups to the teats by means of the automatic handling device 8.

The present invention is not limited to the embodiments disclosed but may be varied and modified within the scope of the following claims.

Accordingly, the cleaning tool 15 may also be carried and supported by the robot arm 10 of the automatic handling device 8. Thereby, the cleaning tool may be held in a cleaning tool holder between the cleaning operations and picked up by the robot arm 10 and the gripping means 11 to perform the cleaning operations as described above.

According to another alternative the support arm 16 and the base structure 17 may be mounted beneath the floor of the milking stall 1, or the arm 16 and the structure 17 may be disposed behind the cow to be cleaned.

Moreover, the cleaning tool 15 may have a different shape and for example be provided with more than one rotating brush. The cleaning tool 15 may also comprise other cleaning means than a rotating brush as disclosed in the above embodiments. For instance, the cleaning tool may comprise a sponge-like cleaning member operating with a rubbing motion, or a rotating disk of a rubber-like or textile material. Furthermore, the brush may be stationary, i.e. not rotating although movable together with the arm 16.

Although the embodiments disclosed above refer to the attachment of the teatcups, it should not be that the determination of the position according to the present invention may be utilized for any animal-related action to be performed, such as insemination, medical treatment, massaging etc of any part of the animal. Thereby, the equipment may include any suitable equipment, such as massaging tools, medical instruments, etc.

Although the present invention has been explained in connection with cows, it should be understood that the inventive idea also may be applied to other animals, for example sheep, goats, horses, buffaloes.

What is claimed is:

1. An apparatus for performing an animal-related action regarding at least a part of the body of an animal, comprising
    a cleaning tool adapted to be brought into contact with the part;
    a support means provided to support the cleaning tool;
    a drive means provided to move the cleaning tool along a contour of the part;
    a sensor provided to sense the contact of the cleaning tool with the animal;
    processing means operatively coupled to said sensor and provided to determine the position of the part in response to said sensor; and
    equipment for performing the animal-related action operatively coupled to said processing means to receive data corresponding to said determined position for use by said equipment in performing the animal-related action.

2. An apparatus according to claim 1, wherein the processing means is adapted to determine said position by determining the coordinates of the cleaning tool.

3. An apparatus according to claim 1, further including means for controlling drive means and thus the movement of the cleaning tool along the contour in response to said sensor.

4. An apparatus according to claim 1, wherein the sensor comprises a force sensing element.

5. An apparatus according to claim 4, wherein the processing means is provided to determine the position of said part in such a way that when a force sensed by the force sensing element exceeds a predetermined measuring level the position of the cleaning tool is registered.

6. An apparatus according to claim 4, including means for controlling the drive means in such a way that when the force sensed by the force sensing element is outside a predetermined control range the direction of the movement of the cleaning tool is changed.

7. An apparatus according to claim 6, wherein the predetermined measuring level lies within the predetermined control range.

8. An apparatus according to claim 7, wherein the processing means is adapted to determine the position of the part when the force sensed by the force sensing element has a value between the predetermined control level and the predetermined measuring level.

9. An apparatus according to claim 1, including data memory means storing data about the contour of the part and means for comparing said data with said position at least on one occasion in order to enable the identification of the part.

10. An apparatus according to claim 1, wherein the drive means is adapted to move the cleaning tool along a first, essentially horizontal direction in a first cleaning step and along a second, essentially horizontal, direction in a second cleaning step, said second direction being essentially perpendicular to said first direction.

11. An apparatus according to claim 1, including means for controlling the drive means for the determination of said position to move the cleaning tool within a limited space, in which the part is expected to be found.

12. An apparatus according to claim 1, wherein the cleaning tool comprises a rotating brush.

13. An apparatus according to claim 1, including equipment for the performance of said animal-related action regarding the part and positioned at least essentially in said position.

14. An apparatus according to claim 13, wherein the part acted upon by said equipment includes a teat.

15. An apparatus according to claim 14, wherein the equipment comprises at least one teatcup and an automatic handling device provided to attach said at least one teatcup to the teat.

16. A method of performing an animal-related action regarding at least a part of a body of an animal, the part having a contour, comprising the steps of:
    bringing a cleaning tool into contact with said part;
    moving the cleaning tool along the contour of the said part;
    sensing the contact of the cleaning tool and said part during said movement along the contour, and by determining the position of said part in response to said sensed contact; and
    transferring data corresponding to the determined position of the part to equipment for performing the animal related action on the part and then performing the animal-related action.

17. A method according to claim 16, including determining said position by determining the coordinates of the cleaning tool.

18. A method according to claim 16, including controlling said movement in response to said sensed contact.

19. A method according to claim 16, wherein said sensing comprises sensing the force resulting from said contact sensed during said movement.

20. A method according to claim 16, including performing said animal-related action regarding said part being positioned at least essentially in said position.

21. A method according to claim 20, wherein said animal-related action comprises automatic attachment of at least one teatcup to a teat.

* * * * *